United States Patent
Aufrichtig et al.

(10) Patent No.: US 7,408,168 B1
(45) Date of Patent: Aug. 5, 2008

(54) SYSTEMS, METHODS AND APPARATUS FOR ADAPTIVE CANCELLATION OF INDUCED ROW NOISE IN X-RAY DETECTOR

(75) Inventors: Richard Aufrichtig, Palo Alto, CA (US); John R Lamberty, Oconomowoc, WI (US); Paul R. Granfors, Sunnyvale, CA (US); Richard Cronce, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/738,440

(22) Filed: Apr. 20, 2007

(51) Int. Cl.
*G01T 25/00* (2006.01)

(52) U.S. Cl. .................................. 250/370.09

(58) Field of Classification Search ............ 250/370.01, 250/370.03, 370.04, 370.05, 370.06, 370.07, 250/370.08, 370.09, 370.1, 370.11, 370.12, 250/370.13, 370.14, 370.15; 348/E13.018
See application file for complete search history.

(56) References Cited

U.S. PATENT DOCUMENTS 4,942,596 A * 7/1990 Eberhard et al. ............ 378/109
2005/0254624 A1 * 11/2005 Kautzer et al. ................ 378/91

* cited by examiner

*Primary Examiner*—David P. Porta
*Assistant Examiner*—Kiho Kim
(74) *Attorney, Agent, or Firm*—Peter Vogel, Esq.; Michael G. Smith, Esq.; William Baxter, Esq.

(57) ABSTRACT

Systems, methods and apparatus are provided through which in some embodiments the line time of an X-Ray detector is dynamically selected so as to nullify an aliased interference signal. The frequency of a noise signal generated by a source external to the digital X-ray detector is determined and, based on the determined frequency, the line time of the digital X-ray is adjusted so as to compensate for the interfering noise. The frequency of the noise can be directly determined from an electromagnetic interference (EMI) sensor or derived through analysis of the power spectrum of the noise signal.

19 Claims, 11 Drawing Sheets

SYSTEMS, METHODS AND APPARATUS FOR ADAPTIVE CANCELLATION OF INDUCED ROW NOISE IN X-RAY DETECTOR

FIELD OF THE INVENTION

This invention relates generally to medical imaging, and particularly, the cancellation of induced noise in an X-ray detector to improve the visual quality of medical X-ray images.

BACKGROUND OF THE INVENTION

Electronic equipment including computer systems frequently emit undesirable electromagnetic radiation, commonly referred to as electromagnetic interference (EMI) or electrical noise. Electrical interference is sometimes called radio-frequency interference (RFI) or electromagnetic interference (EMI). Electromagnetic interference (EMI) may be characterized as an interfering signal generated within or external to electronic equipment. Common interference sources can be video or computer monitors, interventional devices such as radio frequency (RF) ablators, communication systems, intercoms, power-line transmissions, noise from switching devices, and/or spurious radiation from oscillators, etcetera. These noise sources can in combination or singularly contribute to degradation in performance of an electronic system. Electrical interference is the disturbance to the normal or expected operation of electrical or electronic devices, equipment, and systems.

Digital x-ray detectors can be very susceptible to electromagnetic interference (EMI) from external sources. Such interference will create artifacts in the image, sometimes to the point of making it non-diagnostic. Artifacts produced in an image can take many forms such as streaks, blurring, ghosts, and distortion, and will depend on the cause of the artifact and the particular imaging modality used. There are ways of shielding the detector from this external interference with different metals, such as aluminum, copper or mu-metal, a nickel-iron alloy that has a very high magnetic permeability. However, such materials can often not be placed in front of the x-ray detector, as they will absorb the incoming x-ray and degrade the clinical information. Thin metals can be used, but typically the effectiveness of the shielding will be degraded.

For the reasons stated above, and for other reasons stated below which will become apparent to those skilled in the art upon reading and understanding the present specification, there is a need in the art for cancelling the effects of an EMI noise source on an X-ray detector. There is also a need for an improved X-ray detector that can be dynamically controlled to operate at different line times.

BRIEF DESCRIPTION OF THE INVENTION

The above-mentioned shortcomings, disadvantages, and problems are addressed herein, which will be understood by reading and studying the following specification.

The preferred embodiment is useful in an x-ray imaging system comprising a source of x-rays and a digital detector comprising pixel elements arranged in rows and columns for creating data suitable for generating an x-ray image of a portion of a patient. In such an environment, digital x-ray detectors can be very susceptible to electro-magnetic interference (EMI) from external sources. A procedure is described for minimizing the influence of the EMI signal by determining the frequency of a noise signal generated by a source external to the digital X-ray detector, and adjusting the line time of the digital X-ray detector based on the determined frequency of the noise signal.

The system of the present invention includes a processor, a storage device coupled to the processor, and software means operative on the processor for determining the frequency of an external noise signal so as to adjust the line time of a digital X-ray detector. Further, the software means adjusts the line time of the digital X-ray detector based on the determined frequency of the noise signal.

The computer-accessible medium of the present invention directs a processor to determine the frequency of a noise signal generated by a source external to a digital X-ray detector and to adjust the line time of the digital X-ray detector based on the determined frequency of the noise signal.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
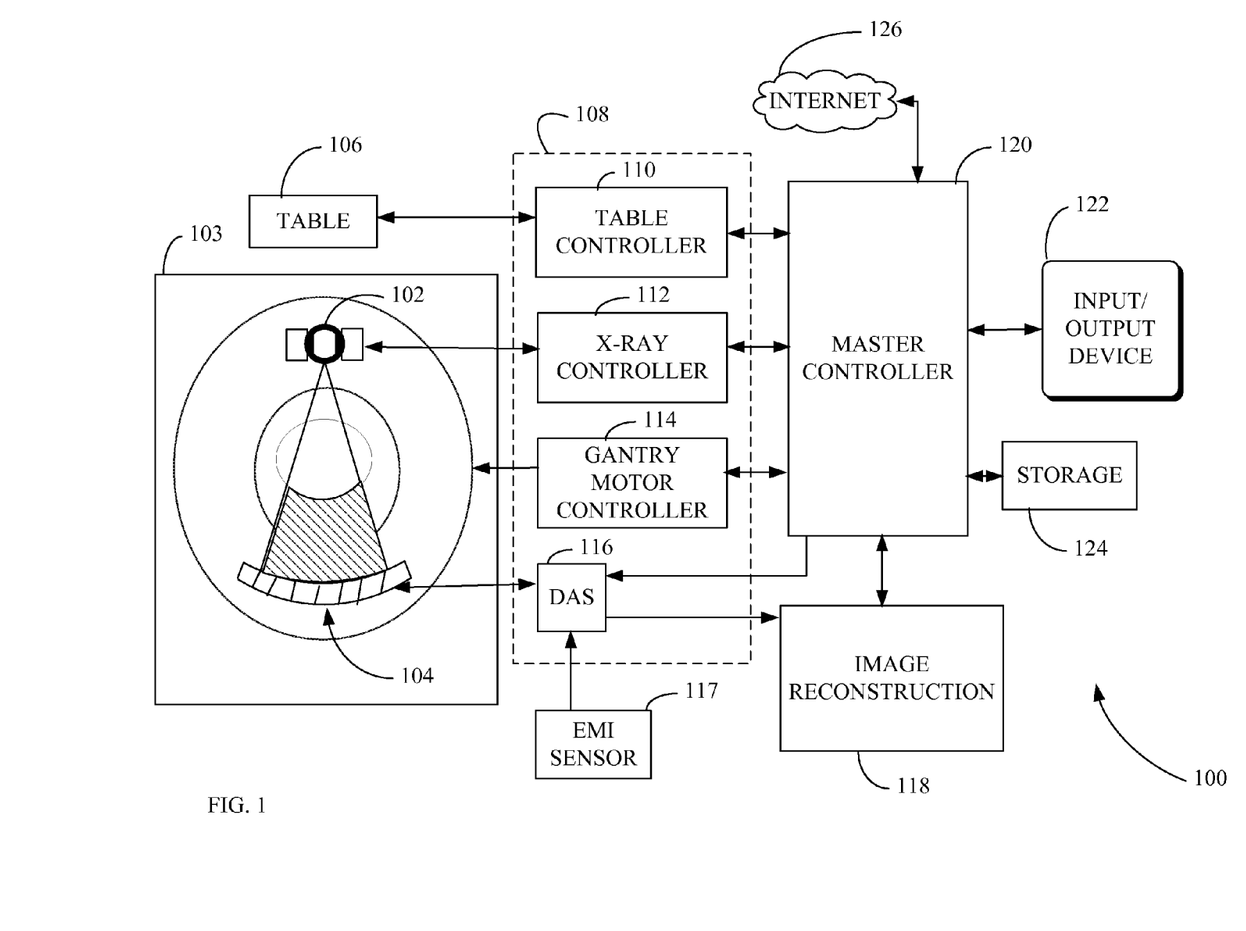
FIG. 1 is a diagram illustrating a system-level overview of an embodiment.

FIG. 1 is a block diagram of an overview of a system to perform medical imaging. Medical imaging system 100 includes a gantry 103, table 106, controllers 108, master controller 126, and image reconstruction device 118. The data acquisition system obtains data including, but not limited to image data, functional image data, and temporal image data. Further examples of data include voxel data including volume information for a three dimensional region of interest (ROI), pixel data including area information for a two dimensional region of interest, and spatio-temporal data. Spatio-temporal data includes area or volume information over a selected, predetermined time period.

Medical imaging system 100 includes a gantry 103 having an X-ray source 102, a radiation detector array 104, a patient support structure and a patient cavity, wherein the X-ray source 102 and the radiation detector array 104 are diametrically disposed so as to be separated by the patient cavity. In an exemplary embodiment, a patient is disposed upon the patient support structure, which is then disposed within the patient cavity. The X-ray source 102 projects an X-ray beam toward the radiation detector array 104 so as to pass through the patient. In an exemplary embodiment, the X-ray beam is collimated by a collimator (not shown) so as to lie within an X-Y plane of a Cartesian coordinate system known to those in the art as the imaging plane. After passing through and becoming attenuated by the patient, the attenuated X-ray beam is received by the radiation detector array 104. In preferred embodiment, the radiation detector array 104 includes a plurality of detector elements wherein each of the detector elements receives an attenuated X-ray beam and produces an electrical signal responsive to the intensity of the attenuated X-ray beam. Generally, column electrodes and row electrodes are disposed on a single piece glass substrate, along with an array of photodiodes and field effect transistors (FETs). A scintillator (not shown) is disposed over the array. The scintillator, which may comprise a dose-efficient cesium iodide scintillator, receives x-ray radiation during operation, and converts the x-ray photons therein to visible light. The high fill factor amorphous silicon array, wherein each photodiode therein represents a pixel, converts the light into an electrical charge. The charge at each pixel is then read out by low-noise electronics, digitized, and sent to an image processor 118.

In addition, the X-ray source 102 and the radiation detector array 104 can move relative to the gantry 103 and the patient support structure, so as to allow the patient to be imaged from different angles. The X-ray source 102 and the radiation detector array 104 communicate with a control mechanism 108 associated with the medical imaging system 100. The control mechanism 108 controls the position and operation of the X-ray source 102 and the radiation detector array 104. Electromagnetic interference (EMI) sensor 117 is well known to those in the art. EMI sensor 117 generates an electrical output corresponding to electromagnetic radiation from a noise source. The EMI sensor 117 can be a b-field receiver, an antenna, or cable directly coupled to the interference source. In direct coupling the EMI sensor 117 receives the signal that may cause the interference directly from the interference source. The electromagnetic radiation level is analyzed by a measurement signal receiving device at the EMI sensor 117 so as to determine the frequency of the noise source.

The table controller 110, X-ray controller, gantry motor controller, DAS 116, image reconstruction 118, and master controller 120 are only limited by the programming in each respective device. For the purpose of the description, all controllers are presumed to have the same hardware; so a discussion of one applies to all. The master controller 120 provides computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

The master controller 120 includes a processor, commercially available from Intel, Motorola, Cyrix and others. Master controller 120 also includes random-access memory (RAM), read-only memory (ROM), and one or more mass storage devices 124, and a system bus that operatively couples various system components to the processing unit of master controller 120. The memory and mass storage devices are types of computer-accessible media. Mass storage devices are more specifically types of nonvolatile computer-accessible media and can include one or more hard disk drives, floppy disk drives, optical disk drives, and tape cartridge drives. The computer readable medium can be an electronic, a magnetic, an optical, an electromagnetic, or an infrared system, apparatus, or device. An illustrative, but non-exhaustive list of computer-readable media can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory. The processor in the master controller executes computer programs stored on the computer-accessible media.

Master controller 120 can be communicatively connected to the Internet 126 via a communication device. Internet 126 connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into the master controller 120 through input device 122 such as a keyboard or a pointing device. The keyboard permits entry of textual information into master controller 120, as known within the art, and embodiments are not limited to any particular type of keyboard. Pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls and point sticks. Other input devices (not shown) can include a microphone, joystick, game pad, satellite dish, scanner, or the like. For the purpose of this description, a keyboard and a pointing device are referred to as a user interface (UI) that allows the user to interact with the X-ray imaging system 100, algorithm, or structure. The output device is a display device. Display device is connected to the system bus. Display device permits the display of information, including computer, video and other information, for viewing by a user of the computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). The controllers also include an operating system (not shown) that is stored on the computer-accessible media RAM, ROM, and mass storage device 124, and is and executed by the processor in the controller. Examples of operating systems include Microsoft Windows®, Apple MacOS®, Linux®, UNIX®. Examples are not limited to any particular operating system, however, and the construction and use of such operating systems are well known within the art.

Master controller 120 can be operated using at least one operating system to provide a graphical user interface (GUI) including a user-controllable pointer. Master controller can have at least one web browser application program executing within at least one operating system, to permit users of the controller to access intranet or Internet world-wide-web pages as addressed by Universal Resource Locator (URL) addresses. Examples of browser application programs include Netscape Navigator® and Microsoft Internet Explorer.

In an exemplary embodiment, the control mechanism 108 includes an X-ray controller 112 communicating with an X-ray source 102, a gantry motor controller 114, and a data acquisition system (DAS) 116 communicating with a radiation detector array 104. The X-ray controller 112 provides power and timing signals to the X-ray source 102, the gantry motor controller 114 controls the position of the X-ray source 102, and the radiation detector array 104 and the DAS 116 receive the electrical signal data produced by detector elements 104 and convert this data into digital signals for subsequent processing. In an exemplary embodiment, the imaging system 100 also includes an image reconstruction device 118, a data storage device 124 and a master controller 120, wherein the processing device 120 communicates with the image reconstruction device 118, the gantry motor controller 114, the X-ray controller 112, the data storage device 124, an input and an output device 122. The imaging system 100 can also include a table controller 110 in communication with the master controller 120 and the patient support structure, so as to control the position of the patient support structure relative to the patient cavity.

In accordance with the preferred embodiment, the patient is disposed on the patient support structure, which is then positioned by an operator via the master controller 120 so as to be disposed within the patient cavity. The gantry motor controller 114 is operated via master controller 120 so as to position the X-ray source 102 and the radiation detector array 104 relative to the patient. The X-ray controller 112 is operated via the master controller 120 so as to cause the X-ray source 102 to emit and project a collimated X-ray beam toward the radiation detector array 104 and hence toward the patient. The X-ray beam passes through the patient so as to create an attenuated X-ray beam, which is received by the radiation detector array 104.

The detector elements 104 receive the attenuated X-ray beam, produce electrical signal data responsive to the intensity of the attenuated X-ray beam and communicate this electrical signal data to the DAS 116. The DAS 116 then converts this electrical signal data to digital signals and communicates both the digital signals and the electrical signal data to the image reconstruction device 118, which performs high-speed image reconstruction. This information is then communicated to the master controller 120, which stores the image in the data storage device 124 and displays the digital signal as an image via output device 122. In accordance with an exemplary embodiment, the output device 122 includes a display screen having a plurality of discrete pixel elements.

Figure 2:
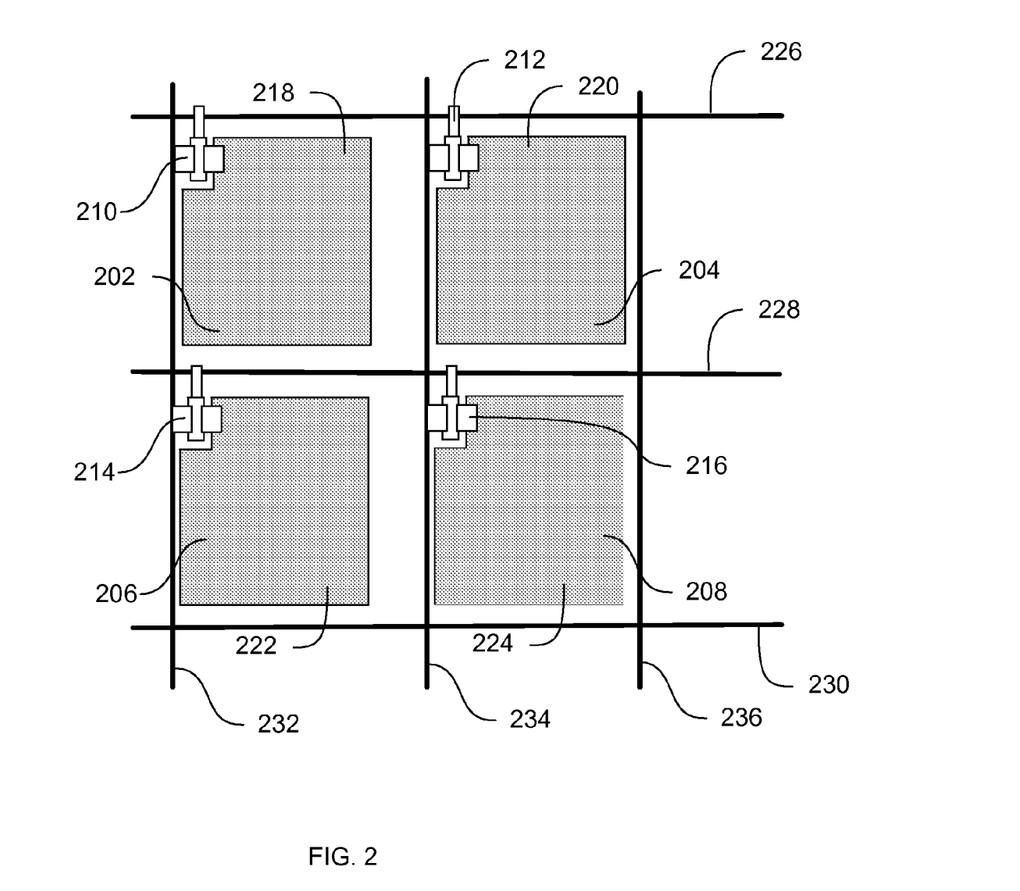
FIG. 2 is a diagram of a prior art plan view of a cluster of four pixels of a prior art solid-state X-Ray detector.

FIG. 2 is a diagram of a prior art plan view of a cluster 200 of four pixels of a prior art solid-state X-Ray detector. Each of the four pixels, 202, 204, 206, 208 includes a field-effect-transistor, 210, 212, 214 and 216 respectively and a photo-diode 218, 220, 222, and 224 respectively. The pixels are separated vertically by scan lines, such as scan lines 226, 228 and 230, and are separated horizontally by data lines, such as data lines 232, 234, and 236. In operation, the X-Ray detector produces an image that can be described as an array of pixels having columns and rows. The clusters are implemented in medical radiographic, cardiographic, angiographic, mammographic, and radiographic and fluoroscopic (R&F) detectors.

Figure 3:
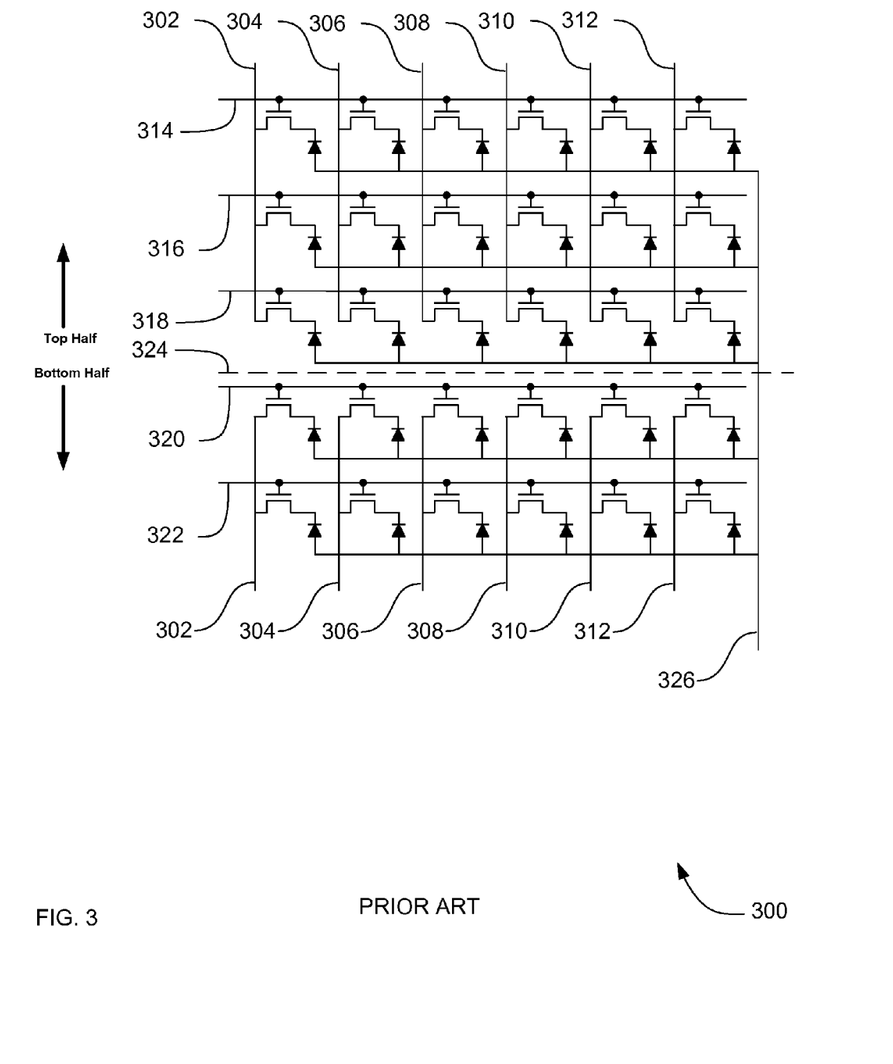
FIG. 3 is a diagram of a prior art schematic representation of a portion of prior art solid-state X-ray detector having split data lines.

FIG. 3 is a diagram of a prior art partial schematic representation of a portion of prior art solid-state X-ray detector 300 having split data lines. The portion 300 is implemented in medical radiographic, cardiographic, angiographic, mammographic, and radiographic and fluoroscopic (R&F) detectors.

The solid-state X-ray detector 300 includes data lines 302, 304, 306, 308, 310, and 312. The solid-state X-ray detector 300 also includes scan lines 314, 316, 318, 320 and 322. The data lines are divided by a split 324 into a bottom half and a top half. The solid-state X-ray detector 300 also includes a common contact 326.

During a line time three things happen in parallel: Firstly, the charge on line n is acquired by turning the field effect transistors (FETs) on; Secondly, the charge on line (n−1) is digitized with an analog to digital (A/D) converter; and, thirdly, the data on line (n−2) is transferred out of the X-ray detector 300. These three events happen in parallel and the X-ray detector 300 is designed so that the three events take approximately the same amount of time.

Figure 4:
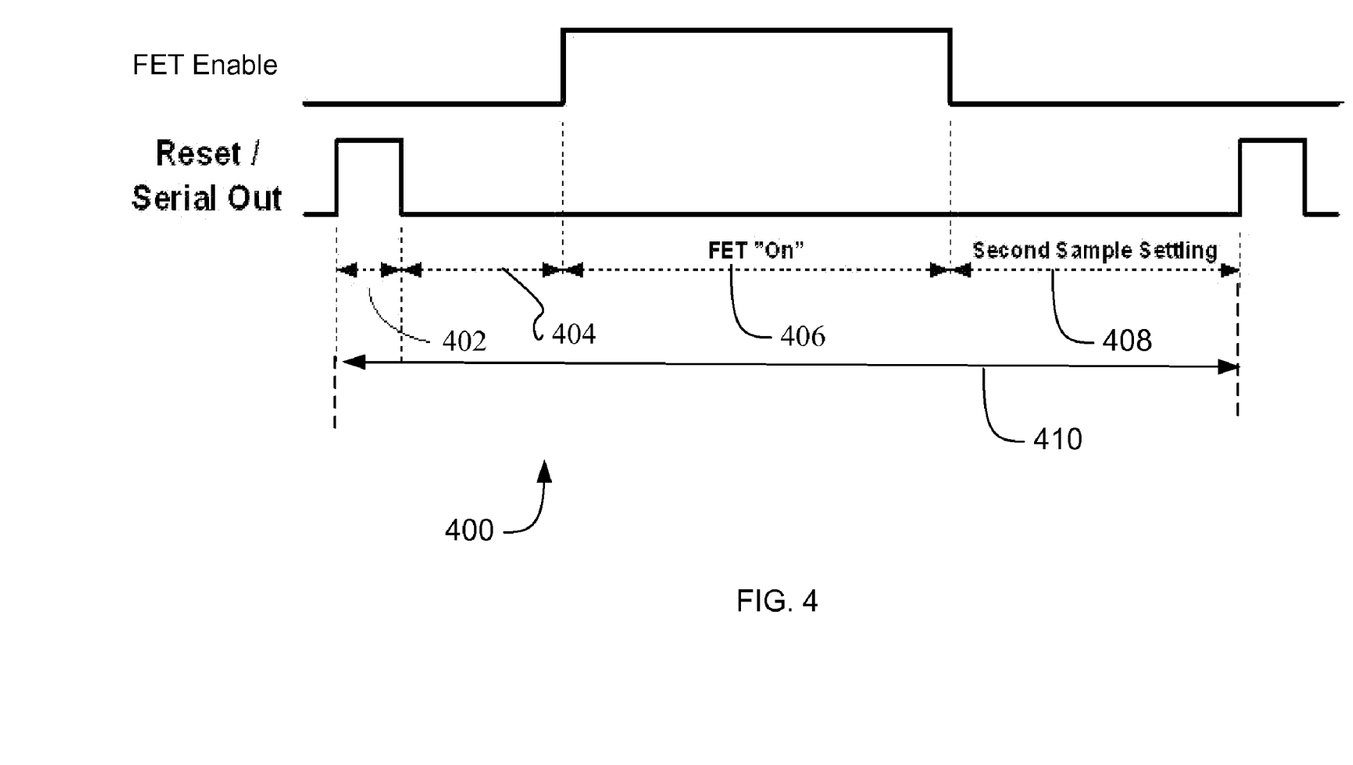
FIG. 4 is a timing drawing showing line time and sampling scheme according to an embodiment.

FIG. 4 is a timing diagram 400 showing integrator reset time 402, first sample setting time 404, field effect transistor on time 406 and second sample setting time 408. The line time 410 is the sum of integrator reset time 402, first sample setting time 404, FET on time 406, and second sample setting time 408. The scan line time 410 can be varied by adjusting the FET on time 406 and/or second sample setting time 408. The EMI noise source often occurs at frequencies that are much higher than the line read-out frequency of an imaging detector. This causes the EMI noise signal to be aliased to a lower frequency within the detector bandwidth. If the true frequency of the EMI noise signal can be determined, the scan line time 410 of the imaging detector can be adjusted in such a way as to place the aliased EMI noise signal into a null for the imaging detector.

Figure 5:
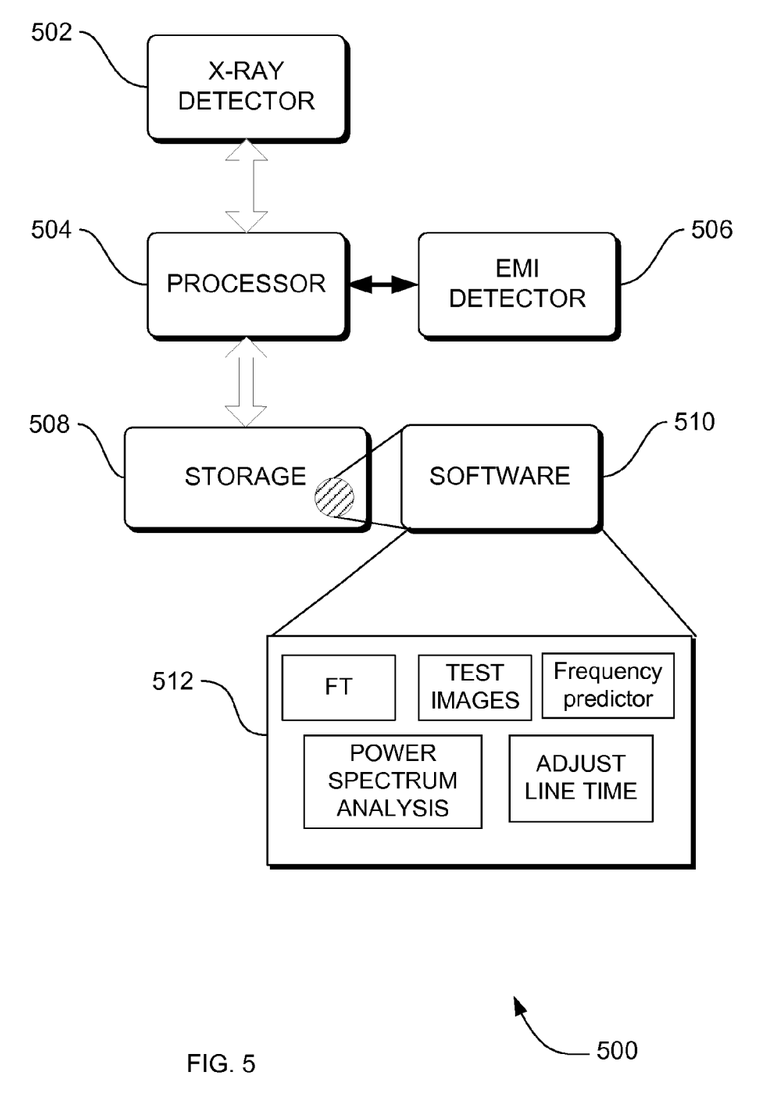
FIG. 5 is a block diagram of a hardware and operating environment in which different embodiments can be practiced.

FIG. 5 illustrates a system overview of a device 500 for dynamically selecting digital X-ray detector line time. The system comprises an X-Ray detector (502), processor 504, electromagnetic interference (EMI) detector 506, storage device 508, and software device 510 having objects 512 for performing analysis. The line time (t) of the X-ray detector 502 can be increased or decreased by an aptly programmed processor (504). The device meets the need in the art for cancelling the effects of an EMI noise source on an X-ray detector. The processor 504 changes the line time 410 of the X-Ray detector 502 so as to operate the X-ray detector in a frequency range where the influence of the noise source is nullified. The processor 504 changes the line time (t) 410 of the X-ray detector 502 by first determining the frequency (f) of the noise source and setting the line time (t) to a value that would minimize interference in the image. The processor 504 can determine the noise frequency either by direct measurement or by indirect measurement. The direct measurement receives data from an electromagnetic interference detector 506 indicating the frequency (f) of the noise source. The EMI detector 506 is any circuit for detecting electromagnetic radiation that could affect the X-Ray detector 502 such as a b-field receiver, an antenna, or cable directly coupled to the interference source. In direct coupling the EMI detector 506 receives the signal that may be the cause of the interference directly from the interference source.

The frequency of the noise source can alternatively be determined by an analysis of the effect of the interference on the signal of the X-ray detector 502 without the use of the EMI detector 506. In this indirect measurement, the response of the X-Ray detector 502 at different operational frequencies (line times) is used to pinpoint the frequency of the external noise source. This is achieved by first slightly varying the line time, $t_o$, of the detector by a small time $\Delta t$ and measuring the aliased interference. This is equivalent to varying the frequency by $\Delta f$, to a new frequency $f_A$ (=$f_o - \Delta f$) to sample images at a different operating frequency for the X-ray detector 502. Three frequency settings are usually enough to ascertain the interference frequency of the noise source. The three frequencies are the normal or customary frequency used to operate the X-ray detector 502 at the imaging facility, a delta amount ($\Delta f$) above the normal frequency, and delta amount ($\Delta f$) below the normal frequency. For example, assuming $f_o$ normal operating frequency, a first image is obtained at frequency $f_o$, a second image at frequency $f_o - \Delta f$, and a third image at frequency $f_o + \Delta f$. The true interference frequency is predicted, and the X-Ray detector 502 frequency is adjusted so as to minimize the influence of the disturbance signal. The processor 504 has access to software 510 that is in storage 508 for varying the frequency, determining the frequency of the aliased interference, and adjusting the line time of the X-Ray detector 502.

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 600-900 are performed by a program executing on, or performed by firmware or hardware that is a part of, a computer, such as master controller 120 of FIG. 1.

Figure 6:
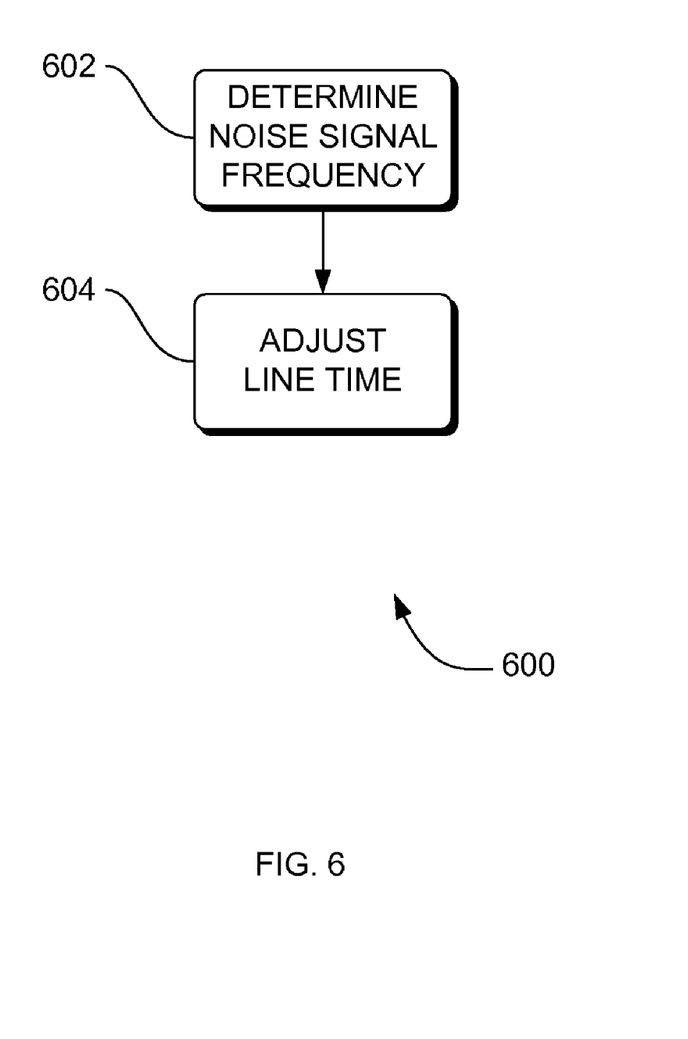
FIG. 6 is a flowchart of a method for dynamically selecting digital X-ray detector line time, according to an embodiment.

FIG. 6 is a flowchart of a method 600 for dynamically selecting digital X-ray detector line time, according to an embodiment. Method 600 solves the need in the art for cancelling the effects of an EMI noise source on an X-ray detector.

Method 600 includes the actions of determining noise signal frequency 602 and adjusting the line time of an X-Ray detector 604.

Method 600 begins with action 602 for determining the frequency of a noise source. Since electromagnetic waves can combine the noise source can be from one or more devices. As noted earlier determining noise signal (EMI) frequency can be ascertained directly through an EMI detector or indirectly by sampling images at different operating frequencies. Once the frequency of the noise source has been determined control passes to action 604 for further processing.

In action 604, the line time of the X-Ray detector is adjusted to nullify the aliased interference. The line time of the X-Ray detector 502 is adjusted so as to be a multiple of the reciprocal of the frequency of the noise source. X-ray detectors with adjustable line time are known to those in the art. See U.S. Pat. No. 7,005,663, "Sampling methods and systems that shorten readout time and reduce lag in amorphous silicon flat panel x-ray detectors," for a discussion of line time and high frame rate imaging. U.S. Pat. No. 7,005,663 is hereby incorporated by reference in its entirety.

Figure 7:
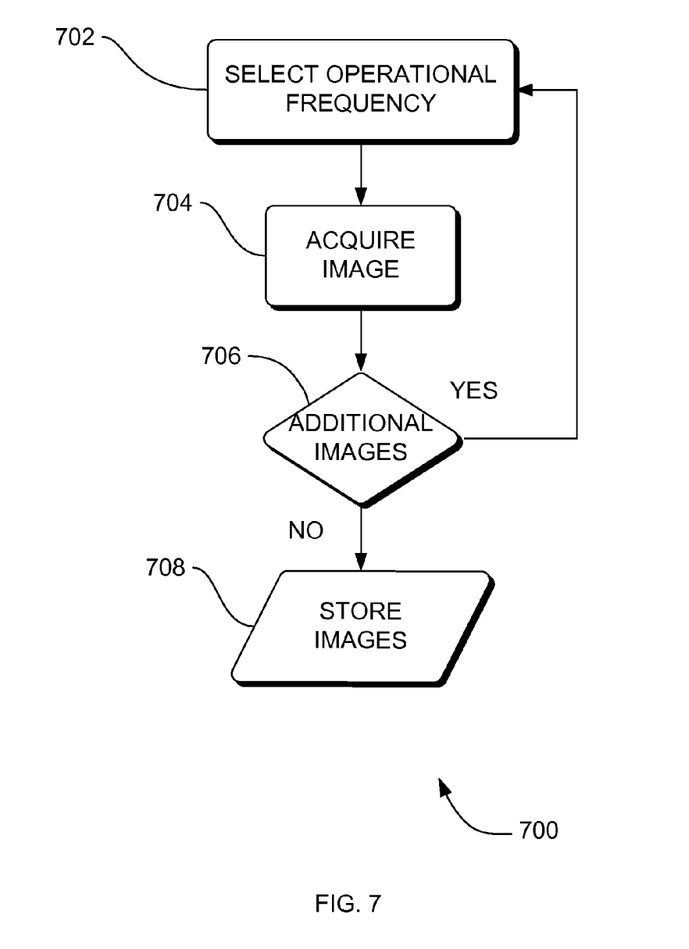
FIG. 7 is a flowchart of a method for acquiring sample images, according to an embodiment.

FIG. 7 is a flowchart of a method 700 for acquiring sample images to analyze for determining the frequency of a noise source, according to an embodiment. Method 700 solves the need in the art for cancelling the effects of a noise source.

Method 700 includes selection of operational frequency 702, acquiring image 704 at the operational frequency, acquiring additional images 706, and storing the acquired images 708. The acquired images can be dark images obtained when the detector is not exposed to radiation. Dark images do not require the use of x-ray, and can be acquired unassisted as a background operation.

Method 700 begins with action 702 selecting operational frequency of X-Ray detector 502. The X-Ray detector 502 is operated at the operational frequency for the acquisition of one or more images. Once the operation frequency has been set at action 702 control passes to action 704 for further processing.

In action 704, an image is acquired. As noted earlier an image is acquired at the operational frequency (f). To improve statistics several images can be taken at the operational frequency. The operational frequency is the line frequency of the detector and is the inverse of the detector's line time. Once the image is acquired control passes to action 706 for further processing.

In action 706, a determination is made as to the acquisition of additional images at different operational frequencies. For example, a first image is obtained at operational frequency $f_o$, a second image at operational frequency $f_o - \Delta f$, and a third image at operational frequency $fo + \Delta f$. The acquisition of additional images is base on the number of operational frequencies the user wishes to analyze in order to ascertain the frequency of the external noise source. Three frequencies would suffice for an accurate determination. However, it is within the scope of the methodology to use more or less than three images for the analysis. Once the images have been acquired control is transferred to action 708 for further analysis.

In action 708, the images are stored with information such as the operational frequency ($F_1$, $F_2$, $F_3$, $F_N$ respectively) of the capture image. The images are stored in a suitable storage system such as a random access memory (RAM) or a read-only memory (ROM).

Figure 8:
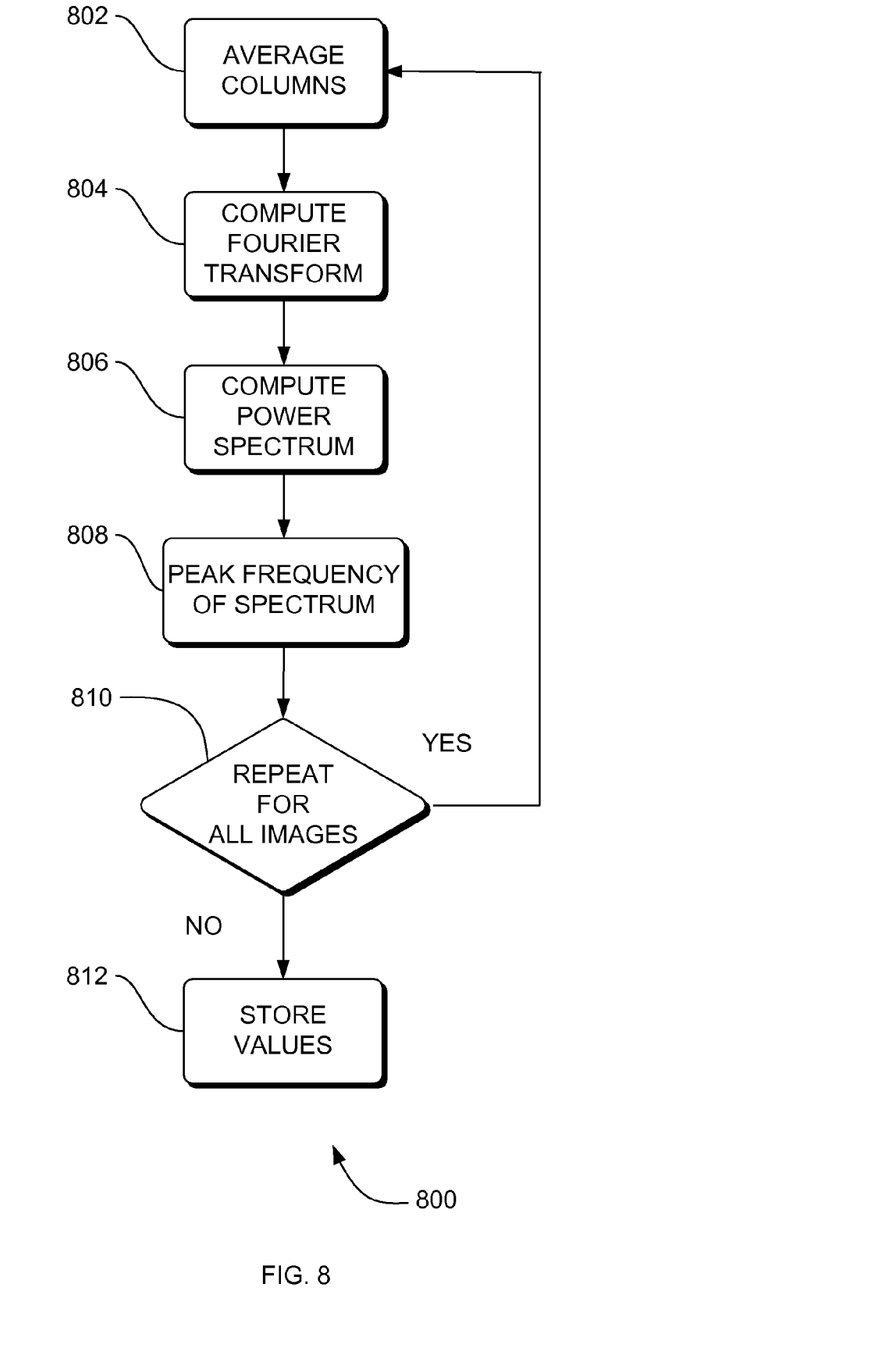
FIG. 8 is a flowchart of a method for acquiring the peak frequency of spectra for the sample images, according to an embodiment.

FIG. 8 is a flowchart of a method 800 for acquiring the peak frequency of spectra for a set of sample images, according to an embodiment. Method 800 solves the need in the art to cancel the effects of a noise source on X-Ray detectors.

Method 800 includes process for averaging columns 802, computing Fourier transform 804, computing power spectra 806, ascertaining the peak frequency of power spectra, repeating for one or more images 810, and storing values 812. The spatial frequency spectrum of an image provides information about the X-Ray detector's response to both external and internal noises.

Method 800 begins with action 802. In action 802, the column signals of the image produced by X-Ray detector 502 are averaged. Once the column signal averages are ascertained control passes to action 804 for further processing.

In action 804, the Fourier transform is determined. The Fourier transform is a frequency distribution of the column averages determined in action 802. Once the Fourier transform is determined control passes to action 806 for further processing.

In action 806, the power spectrum is calculated. The power spectrum is calculated as the square of the absolute value of the Fourier transform. Once the power spectrum has been calculated control passes to action 808 for further processing.

In action 808, the peak frequency of the spectrum is determined. A simple approach to determine the peak frequency (K) is to find the maximum value in the power spectrum, and determine the corresponding frequency from the Fourier transform. Once the peak frequency has been determined control passes to action 810 for further processing.

In action 810, the process of averaging columns 802, computing Fourier transform 804, computing power spectra 806, and determining the peak frequency 808 is repeated for each sample image. The results of the analysis should produce Fourier transform values for each of the sample images and peak frequency values ($K_1$, $K_2$, $K_3$, $K_N$ respectively) for each of the sample images. Once all the sample images have been processed control passes to action 812 for further processing.

In action 812, values are stored. The values are the Fourier transforms of each image, the operational frequency ($F_1$, $F_2$, $F_3$, $F_N$), and the peak frequency ($K_1$, $K_2$, $K_3$, $K_N$ respectively) for each acquired image. The values are stored in suitable storage system such as random access memory (RAM), or read-only memory (ROM).

Figure 9:
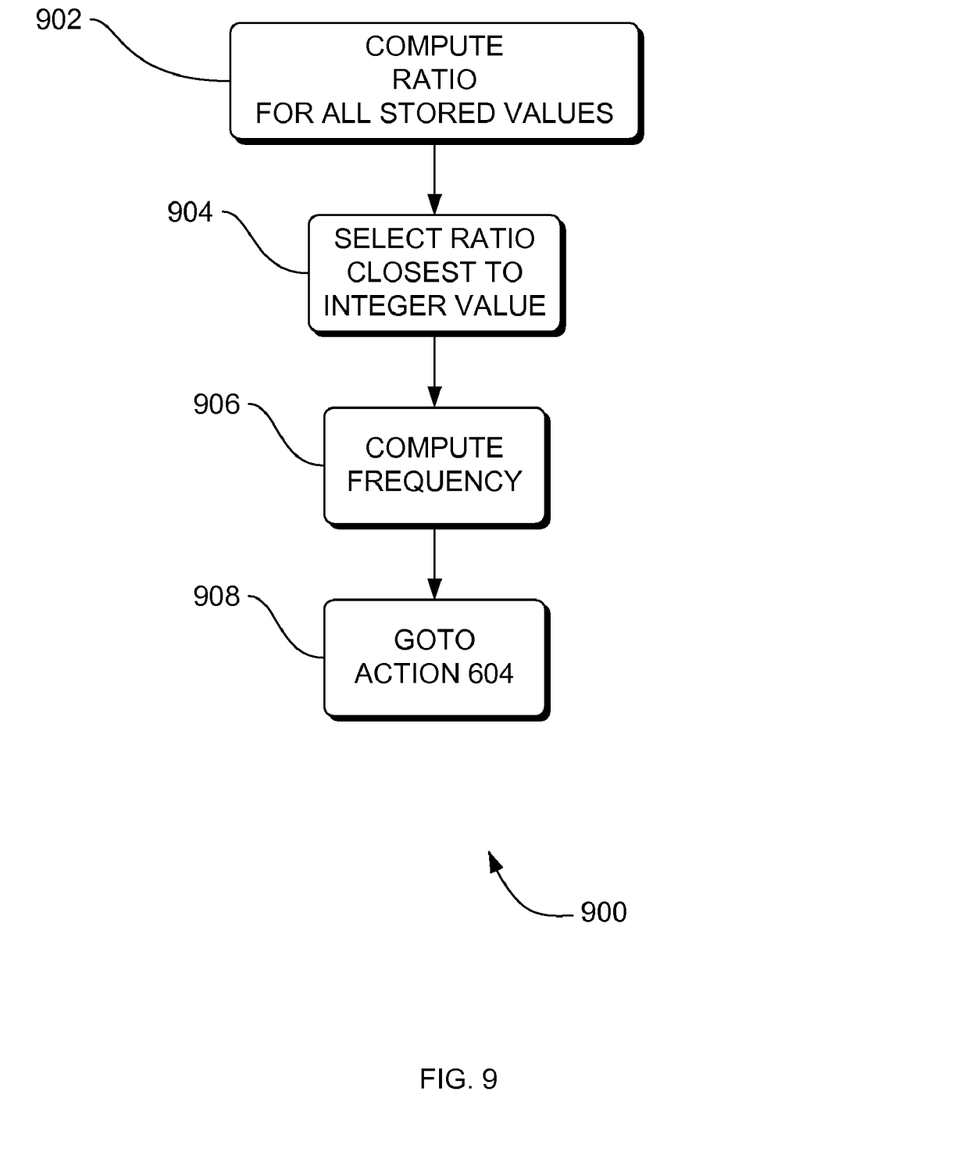
FIG. 9 is a flowchart of a method for computing the frequency of an external noise source from the sample images, according to an embodiment.

FIG. 9 is a flowchart of a method 900 for determining the frequency of an external noise signal, according to an embodiment. Method 900 solves the need in the art for cancelling the effects of a noise source.

Method 900 includes computing ratios 902, selecting a ratio 904 closest to an integer value, computing the frequency of the external noise source 906, and forwarding the computed frequency 908 to controller 116 for implementation.

Action 902, computes ratios for the stored values. The purpose of the ratios is to compute the shifts between the aliased peaks ($K_N$) and the detector operational frequencies ($F_N$). For example, the first ratio ($N_{1,2}$) is proportional to the difference between the peak frequency of the first image ($K_1$) and the second image ($K_2$), and inversely proportional to the difference between the operational frequency of the X-Ray detector for the first image ($F_1$) and the second image ($F_2$). The ratio will mathematically look as follows:

$$N_{1,2} = \frac{K_1 - K_2}{F_1 - F_2}$$

Similarly in the case of three sampled images, the second and third ratios are:

$$N_{1,3} = \frac{K_1 - K_3}{F_1 - F_3}$$

$$N_{2,3} = \frac{K_2 - K_3}{F_2 - F_3}$$

In the case of three sampled images, three ratios ($N_{1,2}$, $N_{1,3}$, $N_{2,3}$) are computed each corresponding to a pair of images. It should be noted that that for each pair of images the ratio computed is that between the difference between peak power spectra and the difference in the operating frequencies. Once the ratios are computed control passes to action 904 for further processing.

In action 904, a ratio is selected based on a predetermined criterion. The calculated ratios ($N_{i,j}$) are analyzed to find the ratio that is closet to an integer value. This identified ratio is used as the gold standard (N) for calculating the frequency of the external noise source in action 906.

In action 906, the frequency of the noise source interference is calculated as follows: If $N_{1,2}$ is the closest to N, the frequency of the noise source is $f_{interference}$=abs ($F_1$*N−$K_1$); If $N_{1,3}$ is closest to N, the frequency of the noise source is $f_{interference}$=abs ($F_1$*N−$K_1$). If $N_{2,3}$ is closest to N, the frequency of the noise source is f=$_{interference}$=abs ($F_2$*N−$K_2$). The aliased interference frequency, f, is equal to $f_{interference}$/N. When the detector frequency is set to f, the detector nulls the aliased interference signal.

In action 908, the determined frequency (f) is sent to action 604 to be implemented by a controller so as to change the line time of the X-Ray detector 502 in accordance to the determined frequency (f). To minimize interference at X-Ray detector 502 set the line time (t) to be as close as possible to 1/f. In some cases, the line time cannot be adjusted with arbitrary precision, but must be a multiple of a time increment $t_\delta$. In this case the line time is set to $t_{discrete}$ as follows:

If $t_o \geq t$ : $t_{discrete} = t_o - t_\delta$*round(($t_o - t$)/$t_\delta$)

If $t_o < t$ : $t_{discrete} = t_o + t_\delta$*round(($t - t_o$)/$t_\delta$)

Where $t_o = 1/f_o$.

In some embodiments, methods 600-900 are implemented as a computer data signal embodied in a carrier wave, that represents a sequence of instructions which, when executed by a processor, such as processor 504 in FIG. 5, cause the processor to perform the respective method. In other embodiments, methods 500-900 are implemented as a computer-accessible medium having executable instructions capable of directing a processor, such as processor 504 in FIG. 5, to perform the respective method. In varying embodiments, the medium is a magnetic medium, an electronic medium, or an optical medium.

Apparatus 500 components of the medical imaging system 100 can be embodied as computer hardware circuitry or as a computer-readable program, or a combination of both. In another embodiment, system 500 is implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 120 in FIG. 1, or on at least as many computers as there are components.

Figure 10:
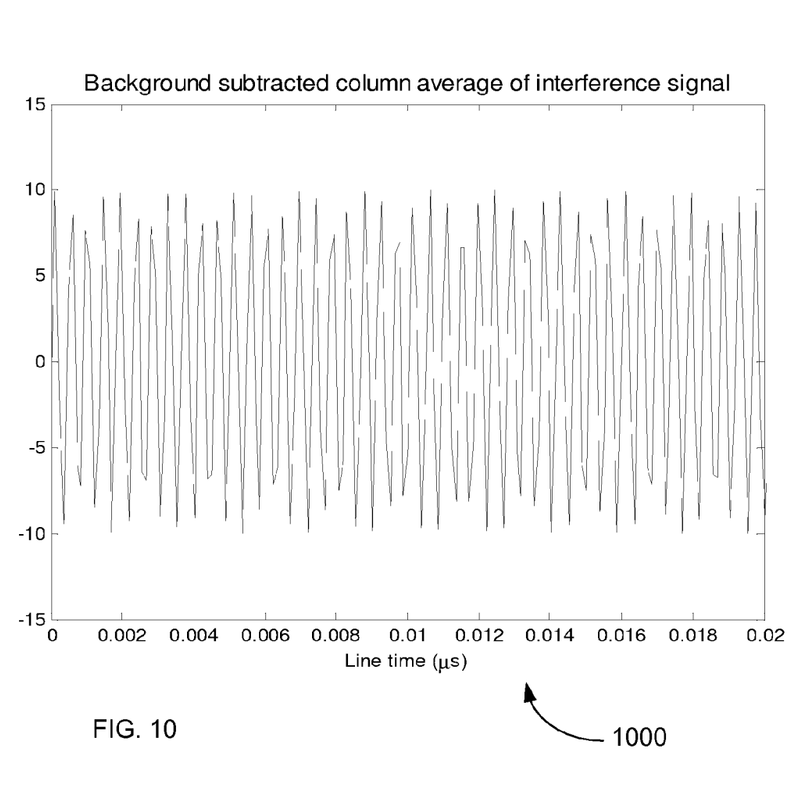
FIG. 10 illustrates column average of an image showing interference source, according to an embodiment.
Figure 11:
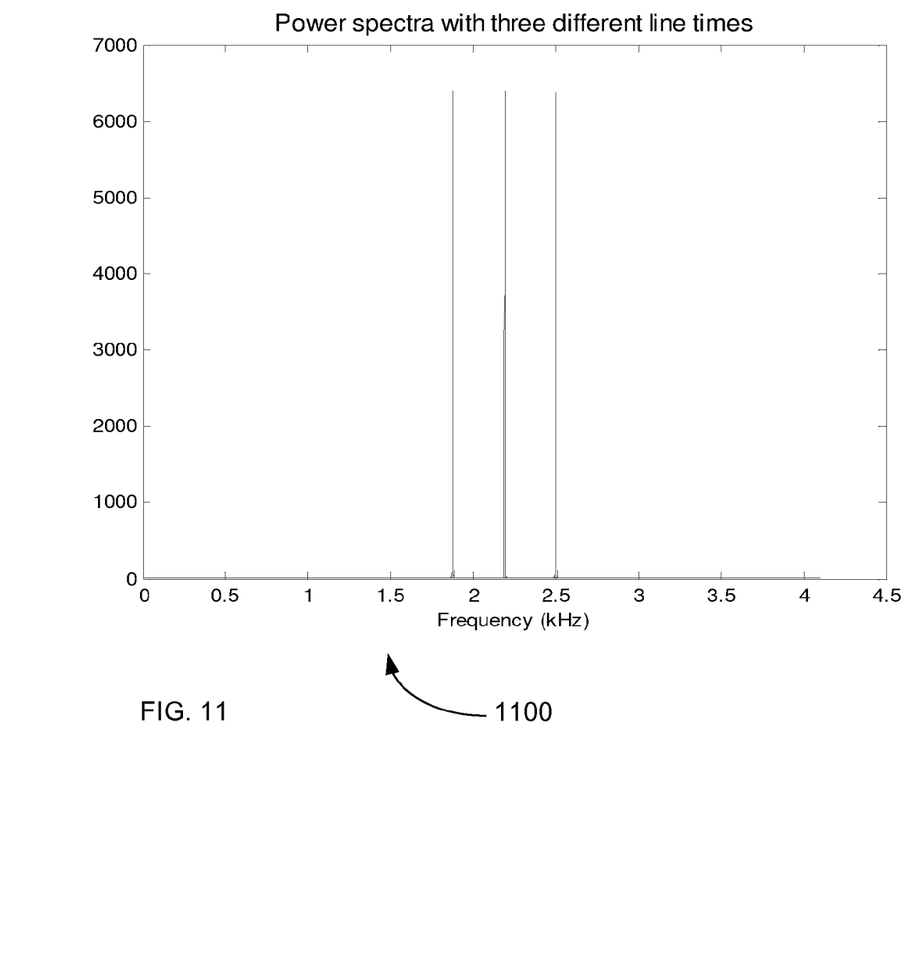
FIG. 11 shows power spectrum of three different line times, according to an embodiment.

FIG. 10 shows column average for an image with interference source. FIG. 11 shows computed power spectra using different line times.

CONCLUSION

A method and apparatus for selecting digital X-ray detector line time is described. A technical effect of the method and apparatus is to cancel the effects of an EMI noise source on an X-ray detector. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

We claim:

1. A method for dynamically selecting digital X-ray detector line time, the method comprising:
   determining the frequency ($f_{interference}$) of a noise signal generated by a source external to the digital X-ray detector; and
   adjusting the line time of the digital X-ray detector based on the determined frequency ($f_{interference}$) of the noise signal,
   wherein the adjusting further comprises: setting the line time as close as possible to an integer multiple of $1/f_{interference}$.

2. The method of claim 1, the method further comprising:
   providing an electromagnetic interference (EMI) detector for determining the frequency of the noise signal.

3. The method of claim 1, wherein determining the frequency of a noise signal further comprises:
   selecting an operational frequency for the X-ray detector;
   acquiring an image using the X-ray detector at the selected operational frequency, wherein the image consist of pixels arranged in rows and columns; and,
   repeating the action of selecting and acquiring for one or more operational frequencies.

4. The method of claim 3, wherein determining the frequency of a noise signal further comprises:
   averaging the columns of each acquired image to produce a column average signal; and,
   computing power spectra from the column average signal for each acquired image.

5. The method of claim 4, wherein determining the frequency of a noise signal further comprises:
   determining the peak power spectrum frequency for each acquired image from the computed power spectra.

6. The method of claim 5, wherein adjusting the line time of the digital X-ray detector further comprises:
   computing a ratio for each pair of acquired images; and,
   selecting from among the computed ratios using a predetermined method.

7. The method of claim 6, wherein adjusting the line time of the digital X-ray detector further comprises:
   computing the desired line time for the X-ray detector using the operational frequencies, the peak power spectrum frequencies, and the selected computed ratio.

8. A system for dynamically selecting digital X-ray detector line time, the system comprising:
   a processor;
   a storage device coupled to the processor;
   software means operative on the processor for:
   determining the frequency ($f_{interference}$) of a noise signal generated by a source external to the digital X-ray detector; and
   adjusting the line time of the digital X-ray detector based on the determined frequency ($f_{interference}$) of the noise signal.

9. The system of claim 8, wherein the adjusting further comprises:
   setting the line time to a value that is as close as possible to an integer times the reciprocal of the determined frequency ($f_{interference}$) of the noise signal.

10. The system of claim 9, the system further comprising:
    an electromagnetic interference (EMI) detector for determining the frequency of the noise signal.

11. The system of claim 9, wherein determining the frequency of a noise signal further comprises:
    selecting an operational frequency for the X-ray detector;
    acquiring an image using the X-ray detector at the selected operational frequency, wherein the image consists of pixels arranged in rows and columns; and,
    repeating the action of selecting and acquiring for one or more operational frequencies.

12. The system of claim 11, wherein determining the frequency of a noise signal further comprises:
    averaging the columns of each acquired image to produce a column average signal; and,
    computing power spectra from the column average signal for each acquired image.

13. The system of claim 12, wherein determining the frequency of a noise signal further comprises:
    determining peak power spectrum frequency for each acquired image from the computed power spectra.

14. The system of claim 13, wherein adjusting the line time of the digital X-ray detector further comprises:
    computing a ratio for each pair of acquired images; and,
    selecting from among the computed ratios using a predetermined method.

15. The system of claim 14, wherein adjusting the line time of the digital X-ray detector further comprises:
    computing the desired line time for the X-ray detector, using the operational frequencies, the peak power spectrum frequencies, and the selected computed ratio.

16. A computer-accessible medium having executable instructions for dynamically selecting digital X-ray detector line time, the executable instructions capable of directing a processor to perform:
    determining the frequency ($f_{interference}$) of a noise signal generated by a source external to the digital X-ray detector; and
    adjusting the line time of the digital X-ray detector based on the determined frequency ($f_{interference}$) of the noise signal;
    wherein adjusting the line time of the digital X-ray detector is setting the line time to a value that is as close as possible to an integer multiple of the reciprocal of the determined frequency ($f_{interference}$) of the noise signal.

17. The computer-accessible medium of claim 16, the executable instructions directing a processor to receive from an electromagnetic interference (EMI) detector the frequency of the noise signal.

18. The computer-accessible medium of claim 16, wherein determining the frequency of a noise signal further comprises:
- averaging the columns of each acquired image to produce a column average signal; and,
- computing power spectra from the column average signal for each acquired image.

19. The computer-accessible medium of claim 18, wherein adjusting the line time of the digital X-ray detector further comprises:
- determining peak power spectrum frequency for each acquired image from the computed power spectra;
- computing a ratio for each pair of acquired images; and,
- selecting from among the computed ratios using a predetermined method;
- computing the desired line time for the X-ray detector, using the operational frequencies, the peak power spectrum frequencies, and the selected computed ratio.

* * * * *